J. V. McCAUGHAN.
TRAP.
APPLICATION FILED MAY 15, 1919.

1,329,128.

Patented Jan. 27, 1920.
2 SHEETS—SHEET 1.

INVENTOR
J. V. McCaughan
BY
Munn & Co.
ATTORNEYS

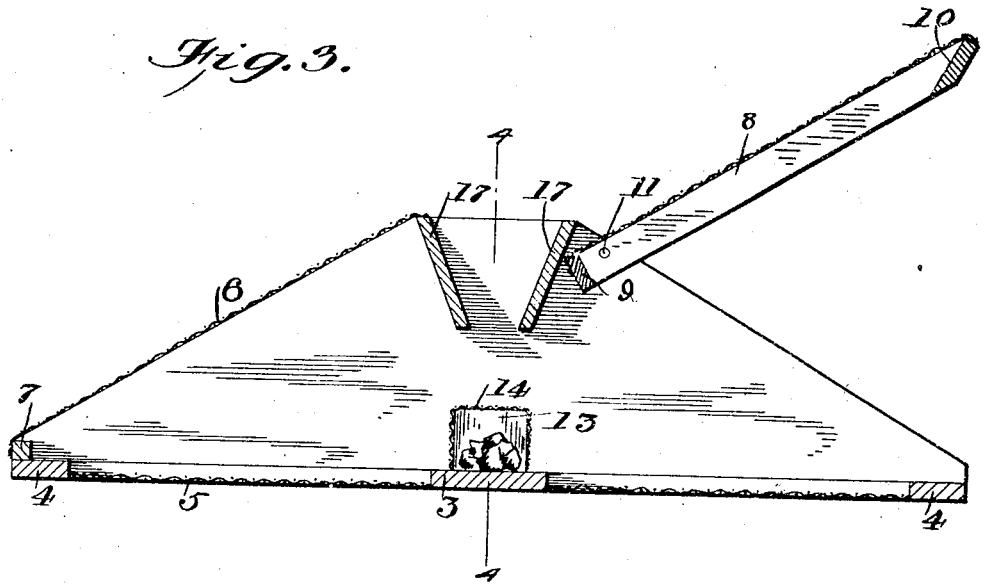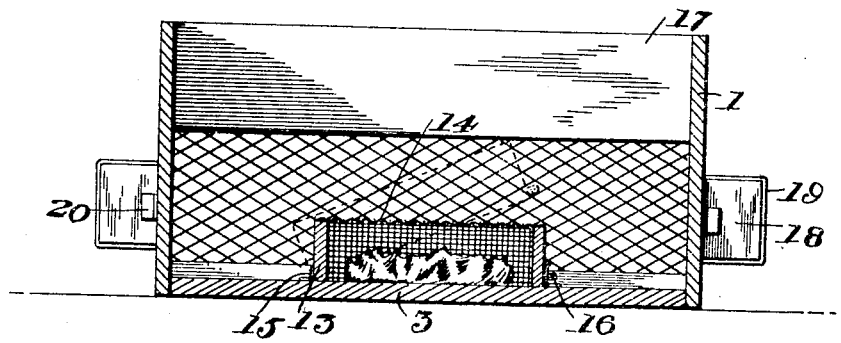

UNITED STATES PATENT OFFICE.

JOANNA VALLAT McCAUGHAN, OF LONG BEACH, MISSISSIPPI.

TRAP.

1,329,128.  Specification of Letters Patent.  Patented Jan. 27, 1920.

Application filed May 15, 1919. Serial No. 297,217.

*To all whom it may concern:*

Be it known that I, JOANNA V. McCAUGHAN, a citizen of the United States, and a resident of Long Beach, in the county of Harrison and State of Mississippi, have invented certain new and useful Improvements in Traps, of which the following is a specification.

This invention relates to an improvement in traps, and more particularly of the type used by fishermen for trapping crabs, shrimps, lobsters, and other shell fish.

One of the principal objects of the invention is to provide an improved trap of this class, of simple and convenient arrangement and of such nature that the fish will be readily attracted and easily confined.

A further object of the invention is to provide a trap of the nature set forth which will be exceedingly simple, durable, efficient of operation and inexpensive of manufacture.

With these and other objects in view which will become apparent as the description proceeds, the invention resides in the construction, combination, and arrangement of parts hereinafter more fully described and claimed, and illustrated in the accompanying drawing, in which like characters of reference indicate like parts throughout the several figures, of which—

Fig. 3 represents a longitudinal sectional view taken through the trap; and

Fig. 4 represents a transverse section on the plane, indicated by the line 4—4 of Fig. 3.

Figure 1:
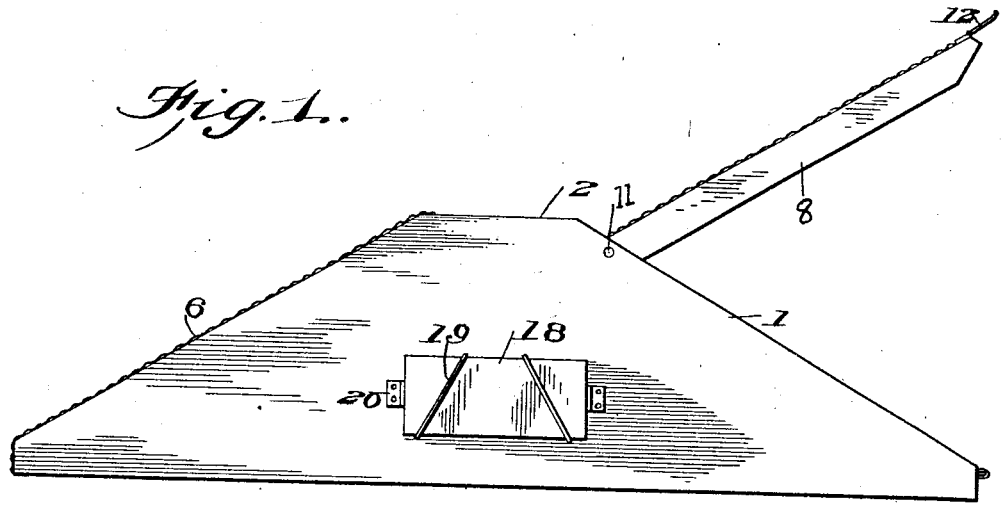
Figure 1 represents a view in elevation of a trap constructed according to my invention.

The invention involves the use of a top entrance having inclined sides, such entrance allowing of the easy passage of the shell fish into the trap but effectually preventing their escape. It also contemplates the employment of a novel means for retaining the bait and of readily emptying the trap.

Referring more particularly to the drawings, the trap includes two side walls 1, which are substantially triangular in shape, being flattened or cut off at their top edges, as at 2. The side walls are connected by a center transom or brace 3, and two end transoms or braces indicated at 4, while netting of suitable texture, indicated at 5, is stretched over the transoms, thus forming the bottom of the trap.

The top of the trap includes a wire screen 6 stretched between the sides 1 along one of the sloping edges thereof, such screen being fixed to the sides and to a sill 7 carried by one of the transoms 4, and also includes a swinging door which forms the other side of the top, and comprises a rectangular frame having side rails 8 and end rails 9 and 10, such frame fitting between the side walls of the trap and being pivoted at 11 thereto. This door may be raised or lowered, as readily understood, upon the points 11 as a pivot. A suitable clasp or hinge indicated at 12 serves as means for normally holding the door in closed position.

Mounted upon the center transom 3 is a cage for covering the bait used in the trap, such cage including end plates or blocks 13 connected by a wire screen 14, which forms a top and sides for the cage. The cage is open on its lower side and is hinged as at 15 at one end to the transom 3. A suitable clasp or other fastening device 16 serves as means whereby the cage may be normally held down in closed position over the bait. This bait is placed on the transom 3 within the cage.

Figure 2:
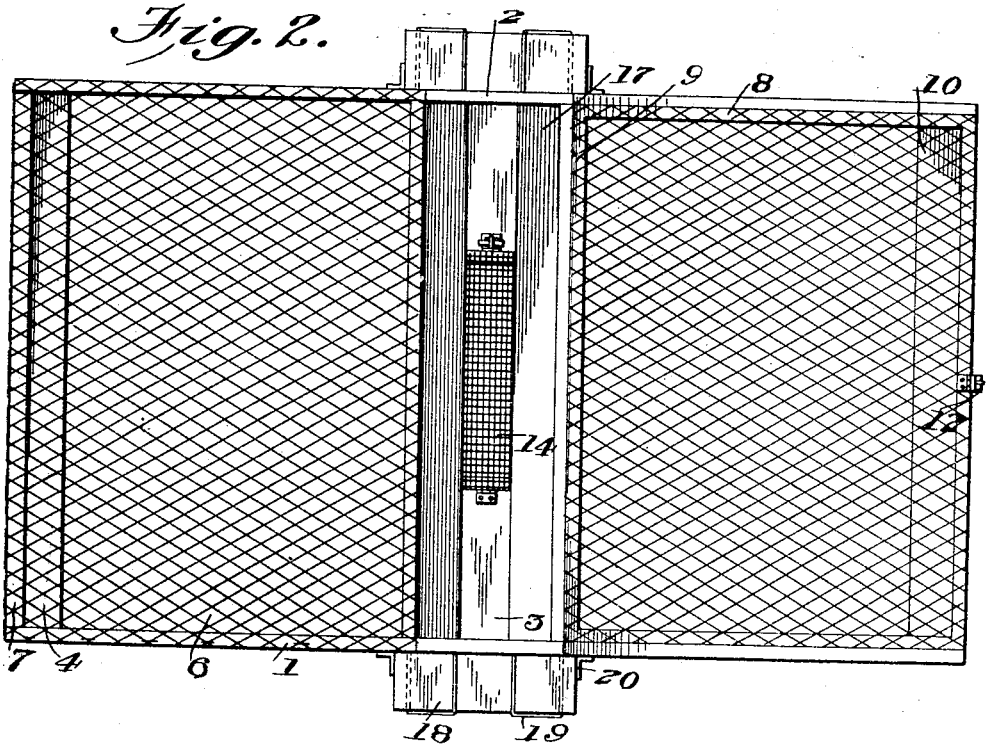
Fig. 2 represents a top plan view thereof.

The entrance to the trap is at the top and is formed by means of two inclined planes 17 of a width substantially equal to the width of the opening and which are inclined toward each other at the bottom, the bottom of the entrance opening being about one-third the width of the top of the entrance opening. The surfaces of these planes are smooth, the purpose being to prevent the shell fish from crawling up the surfaces in trying to make an exit from the top. The plane extends transversely of the top as clearly indicated in Fig. 2, so that the entrance opening is sufficiently great in length to allow ready entrance of a number of shell fish to the trap at the same time. The bait, it will be noted, is placed under the entrance opening. Attracted by the bait, the shell fish will, in trying to get to it, crawl up the screens forming the top of the trap until they come to the entrance opening; this opening will apparently allow them free access to the bait and they will move down to the opening in the top and thus become confined. The only way that they can escape is by moving upwardly, and this they will not do. The inclination or slope of the plate 17 will prevent their crawling up these surfaces should they attempt to do so, and any attempt to escape from the trap in this method, will, in a short time after the trap has been in use, be further hindered by the fact that these surfaces soon become coated with a green slime which will make the surfaces exceedingly slippery and which will prevent the shell fish from obtaining any hold on them.

On the outside, attached one to each of the sides of the trap, are a pair of weights indicated at 18. These weights are for the purpose of sinking the trap and are fastened to the sides by means of wires 19 and brackets 20.

When the trap is to be used the door 8 may be raised and the cage lifted up and the bait placed upon the center transom, the cage will then be lowered and the door will likewise be lowered and fastened in place, and the trap lowered in the water. When it is to be emptied it may be lifted, the water draining out through the wire screen, and the door 8 may be then raised and the shell fish dumped out.

The solid side chambers of the trap will cut off the sight of the bait from any shell fish which are approaching the trap from the sides. However, when these fish have passed beyond the side members the bait will then become exposed to view, and the fish in attempting to reach it will naturally move up the sloping screen to the end 9, through which, in attempting to get to the bait, they will move into the trap.

Although I have described the preferred embodiment of my invention, I may desire to make such changes as do not depart from the spirit of the invention and scope of the appended claim.

I claim:—

A trap of the character described comprising a pair of solid side walls of trapezoidal shape arranged in spaced parallel relation with the shorter of the parallel edges at the top, a bottom formed as a frame secured to the longer of the parallel edges of the side walls and including a central solid strip, said bottom also including wire screen stretched upon said frame, a wire screen wall connecting said side walls and secured to one of the inclined edges of each thereof, a wire screen covered frame pivoted between said side walls at the other inclined edges thereof, a bait holder secured upon the solid transverse strip of the bottom, and a pair of downwardly converging solid plates secured between said side walls at the upper edges thereof and defining an entrance opening.

JOANNA VALLAT McCAUGHAN.

Witnesses:
C. H. CASTANERA,
ARTHUR A. GAUSE.